Figure 1:
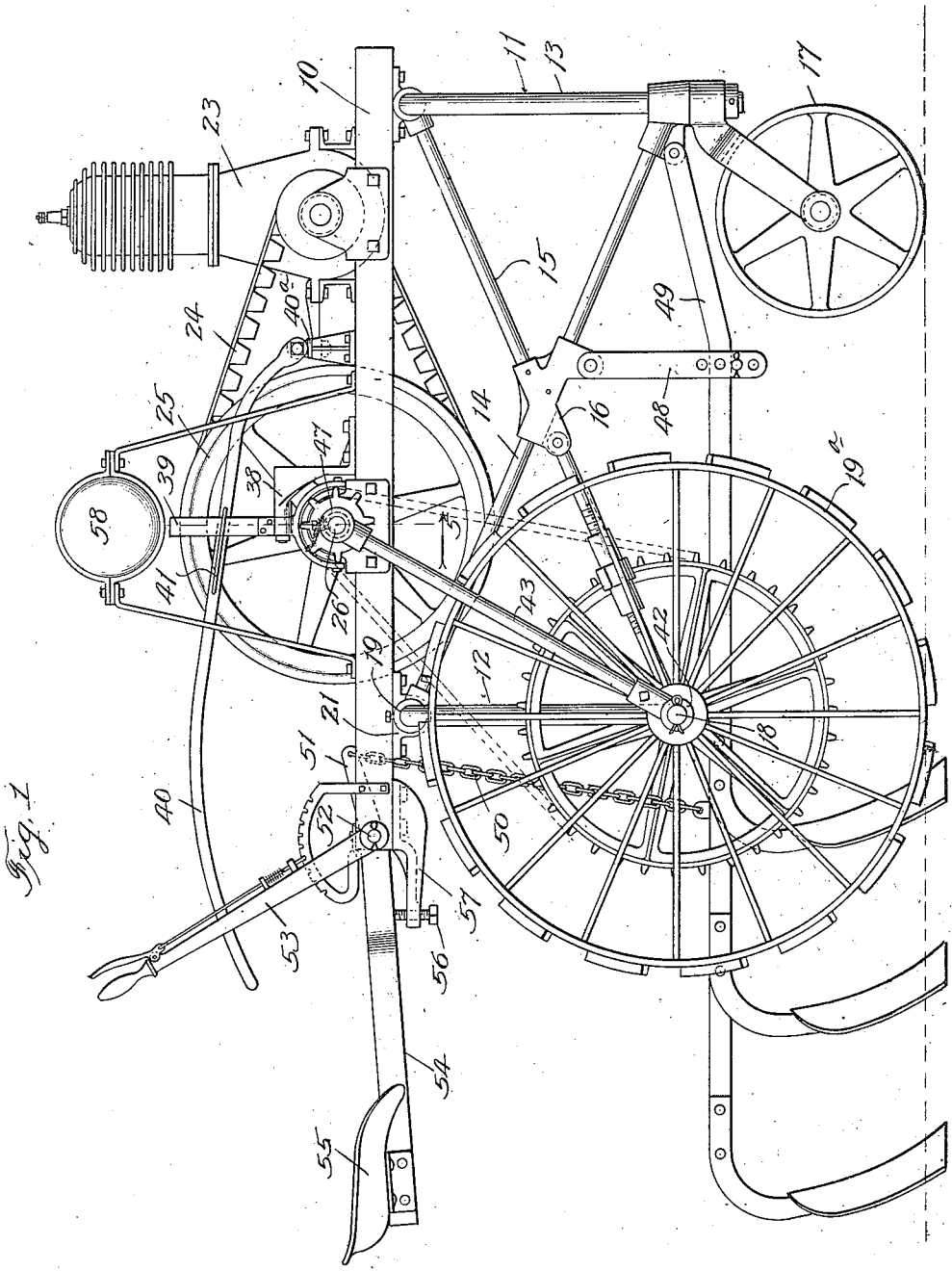

H. C. WAITE.
SELF PROPELLED AGRICULTURAL MACHINE.
APPLICATION FILED DEC. 13, 1915.

1,295,242.

Patented Feb. 25, 1919.
3 SHEETS—SHEET 1.

Witnesses:

Inventor:
Harry C. Waite,
By Dyrenforth, Lee, Chritton and Wiles
Attys.

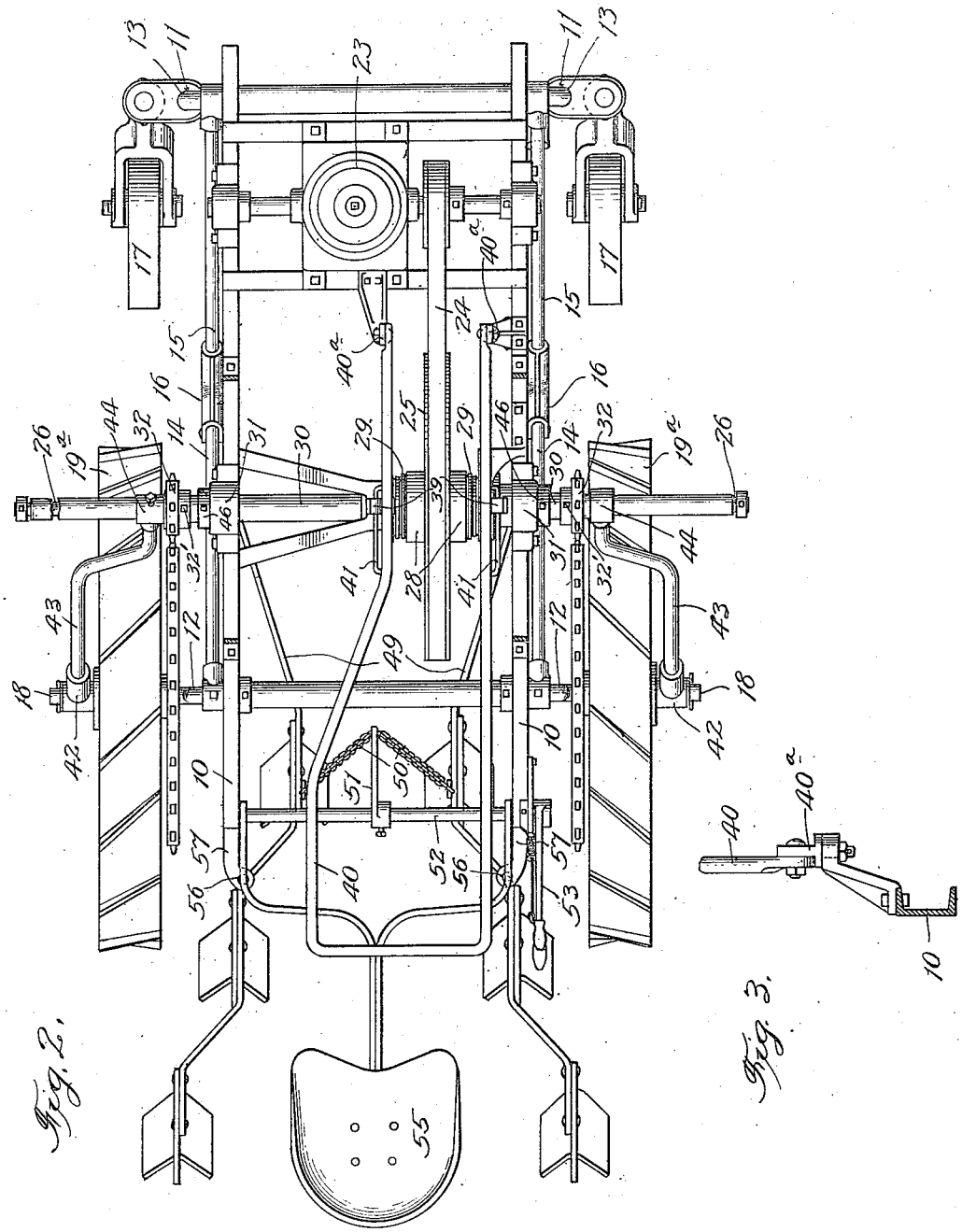

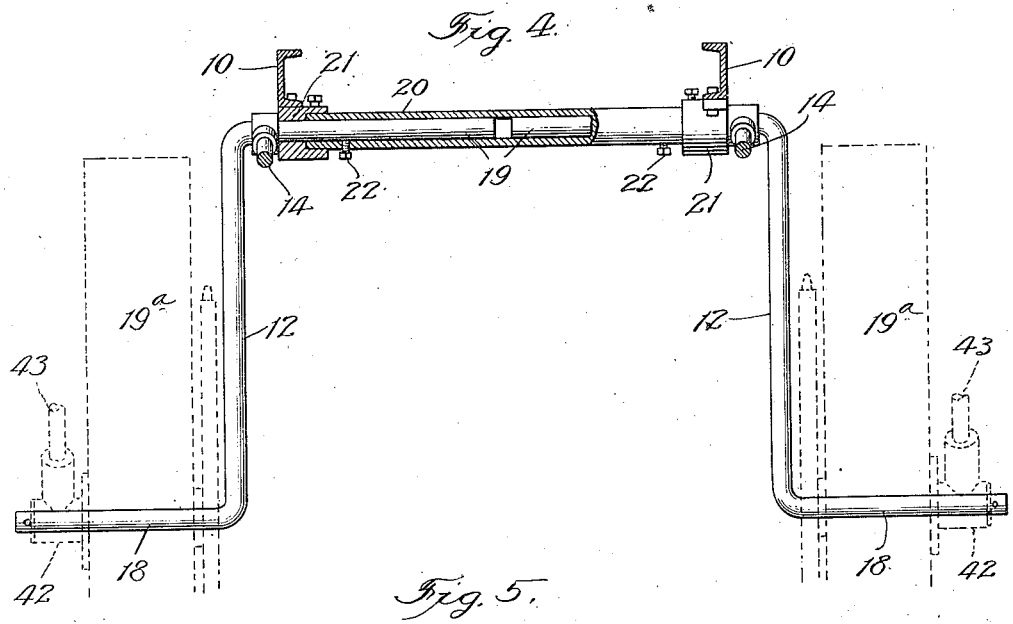

UNITED STATES PATENT OFFICE.

HARRY C. WAITE, OF OAK PARK, ILLINOIS, ASSIGNOR OF ONE-HALF TO BURR A. KENNEDY, OF CHICAGO, ILLINOIS.

SELF-PROPELLED AGRICULTURAL MACHINE.

1,295,242.

Specification of Letters Patent.

Patented Feb. 25, 1919.

Application filed December 13, 1915. Serial No. 66,496.

*To all whom it may concern:*

Be it known that I, HARRY C. WAITE, a citizen of the United States, residing at Oak Park, in the county of Cook and State of Illinois, have invented a new and useful Self-Propelled Agricultural Machine, of which the following is a specification.

My invention relates to improvements in self-propelled vehicles and particularly that type of vehicle used as tractors for agricultural machinery.

The general objects of the invention are to provide a form of self-propelled vehicle having a pair of power-driven tractor wheels located on opposite sides of the vehicle, one or more supporting wheels longitudinally spaced from the tractor wheels and means whereby the complete control of the machine is centered in these tractor wheels. A further object of the invention is to provide a construction in which the tread of the machine may be most readily altered within pre-determined limits. Other objects of the invention will appear more fully from the following detailed specification. In this specification reference will be had to the accompanying drawings in which:—

Figure 1 is a side elevation of a vehicle constructed in accordance with my invention and particularly designed for supporting and drawing a cultivator. Fig. 2 is a plan view of the machine illustrated in Fig. 1. Fig. 3 is a detailed sectional view showing the means for mounting the control bar upon the frame, Fig. 4 is a transverse section through the frame of the machine and showing the means of mounting the rear axle members thereon, and Fig. 5 is an enlarged transverse section through the jack-shaft and clutch mechanism. In the embodiment of the invention shown by the drawings, the frame of the machine comprises an upper generally rectangular structure arranged in a horizontal plane and designated 10 in the drawings, depending from either side of which are vertically disposed frame-sections, generally designated 11. These latter sections are preferably constructed of bar or tubular steel, and comprise rear and front vertical members designated 12 and 13, respectively, connected at their upper and lower ends by the diagonal braces 14, 15, which may be joined at their point of intersection by a casting 16. The lower extending ends of the front vertical member 13 are provided with pivoted caster wheels 17, which serve to support the front end of the frame. The rear vertical members 12 are out-turned at their lower extremities as shown in Fig. 4 to provide stub-axles 18 on which are journaled tractor wheels $19^a$. At their upper ends, both the vertical members 11 and 12 are inturned to provide horizontally-extending portions 19 which are held within transverse sleeves 20 suitably mounted in brackets 21 hung from the lower edges of the frame 10. Set-screws 22 mounted in the sleeve 20 serve to lock the inturned ends 19 in any adjusted position. By this construction the effective width of the frame of my machine may be most readily altered by merely loosening the set-screws 22 and drawing out each side frame member 11 to the desired distance, and again locking the screws 22. It will be noted that each frame member moves outwardly as a unit carrying with it the tractor wheel $19^a$ and the front caster wheel 17.

Suitably supported in the front end of the frame 10 there is an internal combustion engine 23 provided with a driving pulley upon its crank-shaft which, through a belt 24, drives a pulley 25 journaled loosely upon the transverse jack-shaft member 26 (Fig. 5). The pulley 25 is held against longitudinal movement on the jack-shaft as by the ends of the driving sleeves 30, and the hub of the pulley is suitably constructed to provide a pair of oppositely-facing female cone clutch members 28. For coöperating with these clutch members there are provided mating clutch members 29 carried on splines on the driving sleeves 30 which are loosely journaled upon the jack-shaft 26 and supported in bearings 31 carried by the side frame members. The jack-shaft 26 and sleeves 30 project a considerable distance beyond each side frame member, the projecting ends of the sleeves carrying driving sprockets 32 suitably secured for adjustment along the length of the sleeves 30 as by set-screws $32^1$. For holding the clutch-members 29 normally out of engagement with the pulley clutch members 28, there are provided coil compression springs 33 arranged between the opposing faces of each pair of clutch members. For forcing the clutches 29 inwardly against the tension of the spring 33 there are provided a pair of collars 34 which bear against thrust bearings 35 upon the outer faces of the clutch members 29. In addition to their function as means for engaging the clutch members 29, 28, the collars 34 are intended to serve as brake members, and with that end in view each shaft 30 carries a collar 36 secured thereto provided on its inner face with a friction surface for engagement with the outer face of the clutch-actuating collar 34. For shifting the clutch-actuating collars 34, levers 37 are provided having yoke-ends pinned to the clutch collars and pivoted, as in brackets 38 mounted upon the frame. The upper end of each lever 37 is formed as a relatively-stiff spring, designated 39, and slightly outturned at its upper end to diverge from the plane of the pulley-wheel 25. In order to rock the arms 37 and by them to operate the clutches 29 I provide a tiller-yoke or steering handle 40 having its front end mounted upon universal swivels 40$^a$ carried by suitable brackets attached to the frame and carrying hasp members or loops 41 which embrace the outer side of the spring ends 39 of the levers 37. As the tiller-yoke 40 is swung downwardly about its pivot 41 it engages the inclined inner faces of the spring member 39, rocking the arms 37 about their pivots and forcing the clutch members 29 into engagement with the pulley 25. The sprockets 32 being connected by suitable drive-chains with driving sprockets from the tractor wheels 19$^a$, the internal combustion engine 23 thereby serves to operate the tractor wheels to drive the machine forwardly. As the yoke 40 is lifted from the position last described the springs 33 are permitted to force the clutch members 29 outwardly thereby disengaging them from the pulley wheel 25. If the yoke be lifted still farther the hasps 41 swing the arms 37 about their pivots in the opposite direction and force the collars 34 outwardly against the friction surfaces of the sleeve collars 36, thereby retarding or stopping the rotation of the sleeves 30 and operating as a brake upon the tractor wheels 19$^a$. In its three vertical positions therefore the yoke 40 operates as, first, a brake device to exert a breaking action upon the tractor wheels 19$^a$, and second, as a clutch operating member for throwing the clutches 29 into engagement with the driving pulley 25. The tiller-yoke 40, however, has a further function, i. e., to serve as a steering means for the tractor. Assuming that the yoke is in its lower position, as shown in Fig. 5, it will be seen that if it is shifted in one direction or the other laterally, the spring-arm 39 on one side will yield, the corresponding clutch 29 being more forcibly engaged with the driving pulley, while the opposite arm 37 will be rocked to disengage its driving clutch. One tractor wheel 19$^a$ will, therefore, be continuously driven while the other will be freed by the disengagement of its clutch 29. The result of this action will be to cause the tractor to turn toward the free driving wheel, the front casters 17 accommodating themselves to this action. This tendency to turn may be further accentuated by moving the tiller-yoke 40 more forcibly against the spring arm 39. The opposite spring arm will, therefore, be pulled so far over as to cause the corresponding collar 34 to engage against the brake-collar 36 and positively resist or even lock the corresponding tractor wheel. It is therefore possible by this construction to cause the tractor to pivot upon one wheel, to make a complete turn in a radius equal to its wheel base.

In order to permit of the action described above it is necessary that the pulley 25 and sleeves 30 be prevented from shifting laterally. This result is obtained by the construction illustrated in the drawings.

Referring to Figs. 1, 2 and 4, it will be seen that the outwardly extending end of each tractor-wheel shaft 18 has journaled thereon a T-fitting 42 from which a strut 43 projects diagonally upward and forward toward the jack-shaft. The upper end of this strut carries a bearing bushing 44 slidably mounted upon but serving as a radial bearing for the corresponding driving sleeve 30. To lock the sleeves 30 against lateral movement and thereby maintain the pulley 25 in its position, thrust collars 45 are locked upon the sleeves adjacent the frame bearings 31.

The jack-shaft and sleeve construction above described permit of the lateral adjustment to the side frames 11 for altering the tread of the vehicle. It will be seen from Fig. 3 that the jack-shaft and sleeve extend a considerable distance beyond the sprockets 32. When it is desired to adjust the side frames 11 outwardly the sprocket-set-screws 32$^1$ are loosened and the sprockets shifted outward and again alined with the sprockets of the tractor wheel. The set-screws are then locked in position.

The vehicle above described is intended primarily to support and draw cultivators for cultivating simultaneously both sides of a row of plants. As will be seen from Fig. 4, the upwardly arching construction of the axle gives the requisite clearance to the middle of the machine to permit it to straddle a row of plants. A pair of cultivators of any desired form are attached at their front ends to a hitch 48 depending from the side-frame casting 16, a draw bar 49 pivoted at its front end adjacent the caster wheels 17 providing the tractive power for the cultivator. The hitch 48 is preferably provided with a series of bores at different elevations to permit the front end of the cultivator to be supported at the desired height above the ground. From the hitch 48 each cultivator extends rearwardly between the tractor wheels 19ª and has its operative portion lying somewhat to the rear of these wheels. In order to elevate the rear ends of the cultivators out of contact with the ground, chains 50 are connected thereto which chains are led upwardly and inwardly and connected to an arm 51 mounted in the center of the rock-shaft 52 (Fig. 3), suitably journaled in the rear end of the frame 10 and provided with an operating hand lever 53 upon one end. The rock-shaft 52 further serves to journal the forward end of a pivoted seat-supporting arm 54 upon the rear end of which a seat 55 is mounted in such position that the legs of the operator may rest in the stirrups customarily provided in cultivators for driving the same. The arm 54 may be supported in any adjusted position by means of set-screws 56 which bear against the lower faces of the out-turned ends of the arm which are carried in brackets 57 secured to the rear end of the frame 10. A gasolene tank 58 for supplying the internal combustion engine 23 may be supported above the pulley 25, as by the brackets shown in the drawings.

In the operation of my device, the driver will occupy the seat 55, having his feet engaged with the stirrups of the cultivators, and with his hands resting upon the rear cross-bar of the tiller-yoke 40. The entire control of the machine is centralized in this yoke, it being possible to start, stop and steer by vertical and lateral movements of the yoke, as above described. In a position directly above the cultivators, the operator may watch their action, observing simultaneously the positions of the tractor wheels 19ª. Steering of the device is accomplished by changing the driving and braking effect upon these wheels, the construction being such that the shortest possible turning radius is provided. As is well known different species of plants and even the same species of plants under different conditions are planted in rows at varying distances apart. This makes it essential that if the cultivator is to be capable of any wide usefulness, its tread must be correspondingly varied. With my construction wherein there is provided in effect a U-shaped frame of adjustable width, this result is most readily accomplished, and the vehicle fitted for the widest possible range of usefulness.

While I have shown and described in considerable detail one specific embodiment of my invention, it is to be understood that such showing and description is illustrative only and for the purpose of making my invention more clear, and that I do not regard the invention as limited to these details of construction, nor to any of them, except in so far as I have included such limitations within the terms of the following claims in which it is my intention to claim all novelty inherent in my invention as broadly as is possible in view of the prior art.

What I claim as new and desire to secure by Letters Patent is:—

1. In a tractor, a frame, a pair of driving wheels carried thereby, a motor for actuating said driving wheels, a steering handle having a universal movement, a clutch and a brake associated with each wheel, means actuated by a downward movement of the steering handle for actuating both clutches simultaneously to effect a driving connection between the motor and the driving wheels, a lateral movement of the steering handle serving to effect the release of one of said clutches from its associated wheel and to apply the brake to the released wheel.

2. In a tractor, a frame, a pair of driving wheels carried thereby, a motor for actuating said driving wheels, a steering handle having a universal movement, a clutch and a brake associated with each wheel, means actuated by a downward movement of the steering handle for actuating both clutches simultaneously to effect a driving connection between the motor and the driving wheels, a lateral movement of the steering handle serving to effect the release of one of said clutches from its associated wheel and to apply the brake to the released wheel, and a subsequent upward movement of the steering handle effecting the release of both wheels and the application of both brakes.

3. In a tractor, a frame, a pair of driving wheels carried thereby, a motor for actuating said driving wheels, a steering handle having a universal movement, a clutch and a brake associated with each wheel, a flexible lever for operating each clutch and its associated brake, said steering handle having a loose connection with each of said levers, a lateral movement of the steering handle serving to flex said levers and to effect the release of one of said clutches from its associated wheel and to apply the brake to the released wheel.

4. In a tractor, a frame, a pair of driving wheels carried thereby, a motor for actuating said driving wheels, a clutch and a brake associated with each wheel, a vertically extending lever for operating each clutch and its associated brake, the upper end of each of said levers being curved outwardly, a steering handle having a universal movement and having a loose connection with each of said levers, an upward movement of said steering handle engaging the curved ends of the levers to move them so as to effect the simultaneous release of the clutches and the application of both brakes.

5. In a tractor, a frame, a pair of driving wheels carried thereby, a motor for actuating said driving wheels, a clutch and a brake associated with each wheel, a vertically extending lever for operating each clutch and its associated brake, the upper end of each of said levers being curved outwardly, a steering handle having a universal movement and having a loose connection with each of said levers, an upward movement of said steering handle engaging the curved ends of the levers to move them so as to effect the simultaneous release of the clutches and the application of both brakes, a lateral movement of the steering handle toward either side causing the engagement of the clutch and the release of the brake on that side.

6. In a tractor, a frame, a pair of driving wheels carried thereby, a motor for actuating said driving wheels, a clutch and a brake associated with each wheel, a vertically extending lever for operating each clutch and its associated brake, the upper end of each of said levers being curved outwardly, a steering handle having a universal movement and having a loose connection with each of said levers, an upward movement of said steering handle engaging the curved ends of the levers to move them so as to effect the simultaneous release of the clutches and the application of both brakes, a lateral movement of the steering handle toward either side causing the engagement of the clutch and the release of the brake on that side, and the release of the clutch and the application of the brake on the opposite side.

7. In a tractor, a frame, a pair of driving wheels carried thereby, said driving wheels being adjustable to different distances apart, a jack shaft, a driving member disposed on said jack shaft and having connection with the motor, a sleeve disposed on either side of said driving member, a clutch for connecting each sleeve with said driving member, a brake for each sleeve, a steering handle having a universal movement, a transmission member on each sleeve, said transmission members being adjustable to different distances apart, and means for connecting each of said transmission members with one of said drive wheels.

8. In a tractor, a frame, a pair of driving wheels carried thereby, said driving wheels being adjustable to different distances apart, a jack shaft, a driving member disposed on said jack shaft and having connection with the motor, a sleeve disposed on either side of said driving member, a clutch for connecting each sleeve with said driving member, a brake for each sleeve, a steering handle having a universal movement, a transmission member on each sleeve, said transmission members being adjustable to different distances apart, means for connecting each of said transmission members with one of said drive wheels, and means connected with each of said clutches and its associated brake for effecting the release of one of said clutches from its associated wheel and for applying the brake to the released wheel when the steering handle is moved laterally.

In testimony whereof I have hereunto set my hand this 10th day of December, 1915.

HARRY C. WAITE.

In presence of two subscribing witnesses:
A. J. SCHWARTZ,
A. C. FISCHER.